Dec. 29, 1953  C. M. YOUNG  2,664,530
AUTOPILOT CONTROL SYSTEM
Filed July 17, 1948  2 Sheets-Sheet 1

Inventor:
Charles M. Young,
by  [signature]
His Attorney.

Dec. 29, 1953  C. M. YOUNG  2,664,530
AUTOPILOT CONTROL SYSTEM
Filed July 17, 1948  2 Sheets-Sheet 2

Inventor:
Charles M. Young,
by
His Attorney.

Patented Dec. 29, 1953

2,664,530

UNITED STATES PATENT OFFICE 2,664,530

AUTOPILOT CONTROL SYSTEM

Charles M. Young, Schenectady, N. Y., assignor to General Electric Company, a corporation of New York Application July 17, 1948, Serial No. 39,347

17 Claims. (Cl. 318—19)

The present invention relates to automatic control systems and, more particularly, to arrangements for automatically piloting and maneuvering craft.

Automatic regulation of many types of apparatus may be accomplished by servo systems coupled therewith and actuated in response to control signals delivered to these servo systems. The subject invention is directed to improved automatic regulation in the control systems wherein a plurality of control signals are utilized to actuate servo systems and, more specifically, wherein servo systems are actuated at least by a first control signal responsive to changes in a condition which is to be maintained at a selected value and by a second control signal responsive to a condition associated with the servo system or the controlled apparatus.

Representative of the type of automatic regulating arrangement to which this invention may relate might be an automatic pilot for aircraft. Conventional aircraft autopilots function to stabilize the craft about three control axes, namely, the vertical or yaw axis, the longitudinal or roll axis, and the lateral or pitch axis. As is well known, such stabilized control of flight is accomplished by actuating the ailerons, elevators and rudder of the aircraft in response to motions of the craft about the axes with which these control surfaces are associated, and the control surfaces are actuated in directions and to extents required to correct for undesired craft movements and to maintain predetermined flight conditions. Movements of the control surfaces while the craft is automatically piloted are produced by servomotor equipment which may respond to the error signals derived from such apparatus as pendulums, compasses, altitude responsive devices, radio glide path or beacon receivers, or displacement or rate gyroscopic instruments. Additionally, means are provided for producing one or more signals responsive to a condition of the controlled apparatus, such as a repeat-back or follow-up signal responsive to position of each control surface, and this follow-up signal is employed to compensate for certain lags in the autopilot system and to actuate the servo amplifier such that the control surface is moved to return to a predetermined position. Maneuvering may be accomplished by introducing a maneuvering control signal into the input of the servo amplifier and thereby controlling the movements of control surfaces without disengaging the autopilot.

In carrying out my invention in one form, an improved autopilot system is provided with new and novel means for cancelling steady state trim signals produced under certain conditions by signalling means such as follow-up or repeat-back signal generators. For example, it is well known that follow-up signals responsive to movements of a control surface must be applied to the input of the servo amplifier actuating this control surface if autopilot stability is to be maintained and excessive oscillating or hunting of the craft is to be avoided. My copending application, Serial Number 39,345, filed July 17, 1948, for "Automatic Regulating System," explains the functions of follow-up apparatus in detail. Prior systems for obtaining the required follow-up signals have suffered from the disadvantage that the follow-up signals are applied to the associated servo amplifier not only during those transient times when the control surface oscillates or moves rapidly but also during the times when the rudder moves slowly or is not in motion. This latter characteristic results in the undesired application of a steady value of follow-up signal to the servo amplifier if the control surface is normally displaced from a neutral position as is often occasioned when the control surface must be deflected to produce a trim effect on the aircraft. It is therefore preferred that this trim voltage output from the follow-up system be eliminated or minimized, and it will presently appear that the subject invention accomplishes this practically and efficiently and without recourse to the use of large capacitor units. The invention is equally applicable to cancellation of other similar trim signals from other signal sources.

Apparatus of a nature similar to that employed to achieve the aforementioned follow-up signals is also of advantage in connection with realizing further improvements in autopilot systems. More particularly, such apparatus will be hereinafter described for providing automatic synchronization of the autopilot to permit engagement thereof to control the aircraft at any instant and to permit maneuvering with this apparatus. A maneuvering control system utilizing apparatus similar to that of the present invention is disclosed in my copending application, Serial Number 39,346, filed July 17, 1949, for "Airplane Maneuvering System." Maneuvering by means of an autopilot control system is advantageous in that the sensitive autopilot equipment need not be disengaged from autopilot operation to permit maneuvering and then be synchronized with flight attitudes prior to re-engagement. In this invention maneuvering is not only permitted without desensitizing the autopilot but further arrangements are provided whereby the autopiloting system may be placed in control of the aircraft at any time without causing violent craft motion.

One object of this invention, therefore, is to provide a new and improved automatic control system for aircraft.

Another object of this invention is to provide an automatic control system wherein repeat-back or follow-up signals from a controlled device are substantially eliminated when the condition to which such signals are responsive remains constant or varies at a slow rate.

Further, it is an object to provide automatic control apparatus for aircraft whereby trim effects are substantailly eliminated.

Additionally it is an object to provide an automatic piloting system for aircraft wherein the autopilot may be synchronized for safe engagement at any instant to control the craft, wherein non-violent autopilot maneuvering may be achieved, and wherein trim effects may be eliminated.

Other objects and advantages of the present invention will become apparent from the description of the accompanying drawings, in which.

Figure 2:
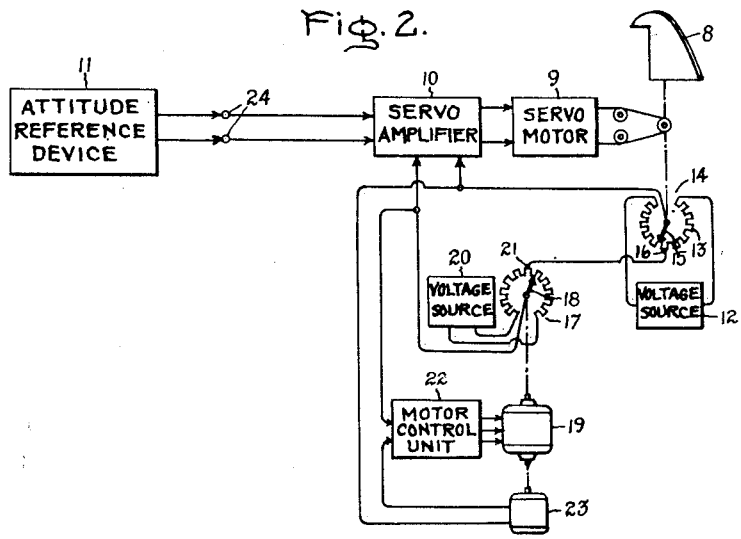
Figure 2 depicts, partly in block and partly in schematic form, an embodiment of one autopilot control channel incorporating the follow-up network of the present invention.
Figure 4:
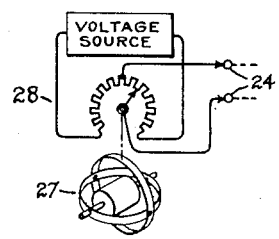
Figure 5:
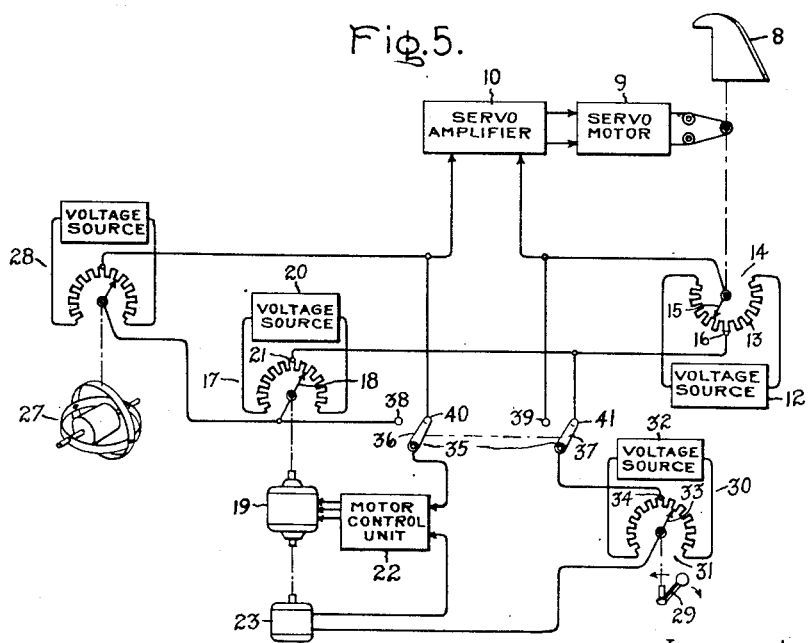

Figure 4 illustrates a gyroscopic instrument adapted for use as an attitude reference device in the system of Figure 2; and Figure 5 shows one channel of an aircraft autopiloting arrangement wherein the apparatus for eliminating follow-up trim effects may be utilized to automatically synchronize the autopilot for engagement to control the craft and wherein improved maneuvering may also be accomplished with the aid of this apparatus.

Figure 1:
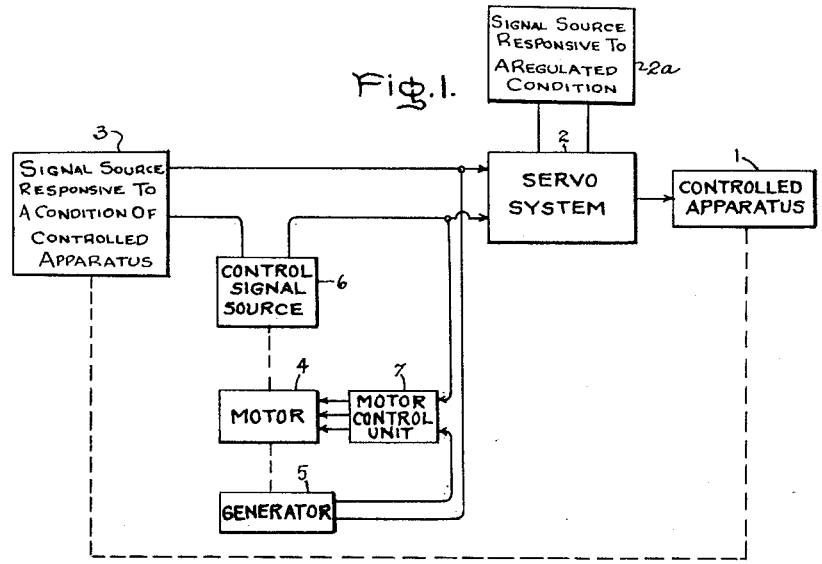
Figure 1 represents in block form one automatic control arrangement in accordance with this invention.

In Fig. 1, a controlled apparatus 1 is actuated by a servo system 2. The servo system includes a primary condition response signal source whose output is characteristic of undesired deviations from the desired value of the primary condition to be regulated, and motor means movable in accordance with the said output. The controlled apparatus includes a member movable to control the primary condition. In addition, there is provided a secondary condition responsive signal source 3, the output of which is characteristic of some other condition of the controlled apparatus which has a variable relation to the primary condition and may have a steady state trim value determined by forces externally to the system. Numerous types of automatic regulating systems may be of this general nature, as, for example, a temperature regulator arrangement wherein heat producing or absorbing apparatus is actuated by servo equipment responsive to the temperature of the enclosure served by such apparatus. This showing of a control system might also relate to a portion of an aircraft autopilot system in which the controlled apparatus comprises a control surface, the error responsive signal source comprises a pick-off device coupled with an attitude reference instrument, and the signal source responsive to a condition of the controlled apparatus comprises a follow-up signal device coupled with the control surface. Other elements of the autopilot system not shown would, of course, be included to achieve the desired autopilot control.

In autopilots, as in certain other automatic regulating systems, it is often desirable that the control signals delivered to the servo system from a follow-up or similar signal device, or a plurality of such devices, be devoid of trim signals, that is, signals of constant value resulting from the substantially steady-state positioning of the follow-up or other signal device in accordance with forces external to the system. Trim signals of this nature are frequently encountered in autopilot follow-up networks when the associated control surface is deflected from a normal streamlined or null position to a new neutral position wherein it causes a desired torque to be constantly applied to the craft, or in general when any condition of the controlled apparatus must be maintained at a steady state value in order to maintain a regulated condition at the desired value.

Cancellation of steady trim signals or very low frequency trim signals is effectively accomplished by the combination shown in Figure 1 as comprising the motor 4, generator 5, control signal source 6, and motor control unit 7. The motor 4 operates at a speed substantially proportional to the amplitude of signals applied thereto from the motor control unit 7 and in a direction dependent upon the polarity or phase of the applied signals. The control unit 7 may comprise a discriminator-type amplifier which produces the required output of motor control signals responsive to the input thereto which is a resultant of the combination of signals from generator 5, control signal source 6 and the condition-responsive signal source 3. Generator 5 coupled with motor 4 for actuation thereby may comprise any suitable device which produces an output of signals variable in amplitude and polarity or phase dependent upon and representative of the movements of a movable element of motor 4. Similarly, control source 6 coupled with motor 4 for actuation thereby may comprise a device for producing control signals having an amplitude and polarity or phase dependent upon and representative of the extent and direction of movement of the movable element of motor 4. The output of signal source 6 is shown connected serially with the output of signal source 3 and the resultant thereof is supplied to the servo system 2. In accordance with this invention, the two signals from sources 3 and 6 are in mutually opposing relation, so that the output of source 6 tends to buck or cancel that of source 3. Motor control unit 7 is responsive to the net control signal applied to the servomotor 2 connected in opposing series circuit or cancelling relation with the rate responsive signal output of the generator 5.

The operation of the control system of Figure 1 may be most easily recognized by first assuming that no signals are produced anywhere in the system. If then the condition to which signal source 3 is responsive takes some new steady state value, as due to a trim deflection of an aircraft control surface, an output signal will be produced by source 3 and this output will have a magnitude and phase characteristic of the new condition. This output of source 3 is supplied to the servo system to actuate the controlled apparatus 1 and is also applied to motor control unit 7 which thereupon causes a movable member of motor 4 to move at a rate and in a direction dependent upon the magnitude and phase of this output signal. Motions of motor 4 also cause signal source 6 to deliver signals as aforedescribed, and, simultaneously, generator 5 is caused to deliver an output. The resulting sequence of operation therefore is that motor 4 begins to move at a rate proportional to the amplitude of signals from the signal source 3, but that this rate decreases as the outputs from generator 5 and signal source 6 oppose the signal from source 3. When the signal output from control signal source 6 is equal and opposite to that from signal source 3, there is no signal applied to motor 4 which then ceases to move. Essentially complete cancellation of the signal from source 3 is thus obtained after any interval of time dependent upon the original amplitude of the signal from source 3 and also upon the output characteristics of source 6 and generator 5.

The important advantage of the foregoing arrangement is realized from the facts that, for slow variations in the output of the condition-responsive signal source 3, this output may be substantially simultaneously cancelled in the aforedescribed manner, but that, for rapid variations in this output, cancellation is negligible or very slight because of the generator output characteristics and because of the inability of the motor and associated equipment to respond to rapidly varying control signals, and therefore this output appears at the input of the servo system 2. One of the most satisfactory applications of such an arrangement is in the cancellation of trim or low-frequency signals from the follow-up equipment of an aircraft autopilot.

Figure 2 represents such an application in follow-up cancelling for the follow-up device in the yaw channel of an aircraft autopilot. For purposes of clarity, only the yaw channel of the autopilot has been illustrated, and it should be recognized that the same principles will apply with respect to other channels and that other equipment not shown may be included in the same channel. The control surface 8 is a conventional rudder which may be deflected by the servomotor 9 responsive to servo control signals from servo amplifier 10. The amplitude and polarity of the output signals from amplifier 10 is determined by the amplitude and phase of the resultant of signals applied to the input of this servo amplifier. One of the amplifier input signals is, conventionally, the output of an attitude reference device 11, which may comprise, in combination with a pick-off unit, a rate or displacement gyro, compass, pendulum, or radio receiver. Follow-up or repeat-back signals are applied to servo amplifier 10 from a follow-up device of the potentiometer type and including the voltage source 12 connected across the resistance unit 13 of follow-up potentiometer 14. The potentiometer wiper arm 15 is mechanically actuated by the servomotor 9 such that its movements correspond to those of control surface 8, and the follow-up signal output appearing between wiper arm 15 and tap 16 is one variable in magnitude and phase dependent upon the extent and direction of the movement of the wiper arm from coincidence with the fixed tap 16. Serially connected with the output of the follow-up potentiometer is the output of the follow-up canceller potentiometer 17 whose upper arm 18 is rotated by motor 19. Voltage source 20 is connected across the resistive element of potentiometer 17, and the output signal appearing between wiper arm 18 and fixed tap 21 is variable in magnitude and phase dependent upon the extent and direction of movement of wiper arm 18 from coincidence with tap 21. The operation of the follow-up canceller arrangement is such that the voltage from potentiometer 17 tends to cancel that from follow-up potentiometer 14.

Motor 19 is actuated in either of two directions and at a rate determined by the phase and magnitude of the signals applied thereto from the motor control unit 22. As previously described with respect to Figure 1, the input signals to the motor control unit are the resultant of signals from the follow-up canceller, signal source, and generator degeneratively combined with the follow-up signals. Generator 23 is coupled with motor 19 to produce the required output signals varying in phase and magnitude with the direction and rate of motor motion. When the frequency of oscillatory motion of control surface 8 is very high, the canceller potentiometer 17 cannot effectively follow the movements of follow-up potentiometer 14 due to the high value of the output of generator 23 when motor 19 moves rapidly, hence these high frequency follow-up signals needed for autopilot stability appear at servo amplifier 10. However, when the control surface is at a steady trim position or moving very slowly, the follow-up canceller potentiometer is able to produce an output which substantially cancels that from the follow-up potentiometer, and the undesired trim signals are effectively eliminated.

Figure 3:
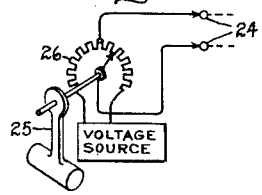
Figure 3 illustrates a pendulum-type attitude reference device which may be employed in the system of Figure 2.

It should be apparent that the attitude reference device 11 of Figure 2 which delivers its output of control signals to servo amplifier 10 through terminals 24 may include various types of instruments. Figure 3, for example, illustrates a pendulum device 25 adapted to actuate the potentiometer-type pick-off 26 to produce the desired attitude reference signals. In an aircraft turn which is not properly coordinated, the pendulum will not remain in the position normally maintained in straight flight, and appropriate error signals will appear at terminals 24. This combination of a pendulum sideslip detector and the follow-up canceller arrangement in an autopilot is a very advantageous one in that for the first time it makes possible reliable ball-center type turning under autopilot control. Heretofore, troublesome trim effects associated with the control surfaces for producing ball-center turns precluded the realization of acceptable autopilot systems which could perform this maneuver. Figure 4 depicts another form of attitude reference device comprising a directional gyro 27 and the potentiometer-type pick-off 28.

The system embodied in Figure 5 provides for follow-up cancellation similar to that in the system of Figure 2, and additionally, the follow-up cancelling equipment may be utilized to provide automatic synchronization of the autopilot to permit engagement at any instant. Components of this autopilot similar to those previously described in Figures 2 and 4 have been represented by the same numerals. The directional gyro 27 actuates the potentiometer pick-off 28 which produces the required output of error signals variable in amplitude and phase. This error signal output is serially connected with the outputs of the canceller potentiometer 17 and the follow-up potentiometer 14, the latter outputs being connected to have a degenerative effect upon the error signal output. Servo amplifier 10 is thus controlled by the resultant of these three signals. A maneuvering control stick 29 is shown for actuating a maneuvering control station pick-off 30 which comprises the potentiometer 31 connected across voltage source 32. An output of maneuvering control signals variable in magnitude and phase is caused to appear between the wiper arm 33 and fixed tap 34 of the potentiometer 31, and this output is serially connected with the signals applied to control unit 22 of the cancelling system including motor 19 and generator 23.

When the double-pole double-throw switch 35 is positioned such that the switching arms 36 and 37 contact terminals 38 and 39 respectively, and when the maneuvering control stick is at a neutral position such that no signal output is produced by control station potentiometer 31, follow-up signal cancellation is achieved in the same manner as described with reference to Figure 2. This is true, because, with such connection, the motor 19 responds to the combined signals from generator 23, follow-up potentiometer 14, and follow-up canceller potentiometer 17.

When switch 35 is positioned such that switching arms 36 and 37 contact terminals 40 and 41, the autopilot equipment is arranged such that canceller potentiometer 17 produces an output voltage which effectively cancels the error signal output from the attitude reference pick-off potentiometer 28. Motor control unit and motor 19 then respond to the combined signals from generator 23, pick-off potentiometer 28 and canceller potentiometer 17. Motor 19 moves to cause the potentiometer 17 to cancel the error signal output at all times if the frequency of error signal variations is low enough, hence the autopilot servo equipment may be energized at any instant when switch 35 is connected as presently considered without causing violent aircraft attitude changes due to the presence of a large error signal. After the autopilot has been caused to assume control of the craft, the switch 35 may be reversed such that terminals 38 and 39 are contacted, whereupon steady-state follow-up cancellation is achieved by the apparatus of this invention. Violent attitude changes are prevented at the time such switching takes place because of the inherent time delay and slow rate at which canceller potentiometer 17 can change its output. The control station 30 may be employed to permit maneuvering of the aircraft while under autopilot control. Manual movement of the miniature control sticks 29 causes maneuvering control signals to be applied to the motor control unit 22 from potentiometer 31 and to servo amplifier 10 from potentiometer 17.

While it has been preferred to illustrate potentiometer-type pick-off, follow-up, canceller, and control station means for obtaining the required control signals, these have been depicted primarily for the sake of clearness in understanding the invention and it should be realized that selsyn-type inductive instruments are presently preferred and that these may be substituted for the potentiometers. The voltage sources shown may be D. C. or A. C. and may be replaced by a single source unit if desired. Also, the generating means coupled with the motor may comprise a selsyn or potentiometer pick-off unit and associated equipment for obtaining a voltage proportional to speed rather than a convention generator. The generator output characteristics with respect to speed may be selected or adjusted to secure the optimum rate of change of the canceller signal for particular requirements, and the motor control unit or the motor itself may be adapted to prevent excessive or insufficient rates of changes of the canceller signals. A complete multi-channel autopilot might of course include components in addition to or different from those it has been chosen to illustrate herein, and, by way of example, selsyn-type instruments might be employed in place of potentiometers; the attitude reference device might be of the direct displacement or rate of attitude change type, the follow-up device might respond to control surface forces instead of displacements; and means may be provided to compensate for lags or to eliminate other trim effects in the autopilot system.

It should be apparent, therefore, that there are numerous changes which could be made in the above-described constructions by those skilled in the art without departing either in spirit or scope from the present invention. Hence, it is intended that all matter contained in the foregoing description or shown in the accompanying drawings shall be interpreted as illustrative and not in a limiting sense.

What I claim to be new and desire to secure by United States Letters Patent is:

1. A condition responsive control system comprising a member movable from a normal null position to control said condition, motor means for moving said member from said null position throughout a range of condition controlling positions, said position having a variable trim relation to the desired value of said condition, means for generating a first signal responsive to deviation of said condition from a predetermined normal value, means for generating a second signal responsive to displacement of said member from said null position, means for combining said first and second signals in opposing relations and utilizing the resultant signal to control said motor means, and time element means selectively responsive to non-transient presence of said first or second signal to generate a bucking signal substantially equal and opposite thereto.

2. A condition control system comprising a member movable from a normal null position to control said condition, motor means for moving said member, means for generating a first signal in response to deviation of said condition from a desired value, means for generating a second signal proportional to displacement of said member from said null position, means combining said first and second signals in opposing relation and utilizing the resultant signal to actuate said motor means, a second motor having an element movable in response to said resultant signal, means actuated by said second motor to oppose movement of said element in proportion to its rate of movement, and means actuated by said second motor for generating a third signal proportional to displacement of said element and selectively utilizing said third signal to oppose said first or second signal.

3. A condition responsive control system comprising a member movable from a normal null position to control said condition, motor means for moving said member, signal circuit means including a plurality of signal voltage sources connected in series circuit relation to energize said motor, means responsive to deviation of said condition from a desired normal value and connected to control one said signal voltage source, means responsive to displacement of said member from said null position and connected to control a second said voltage source, said first and second signal voltage sources being connected in opposing relation in said signal circuit, a third signal source, and means responsive to the substantially steady state output difference of said second signal voltage source and said third signal voltage source connected to control said third signal voltage source in a sense substantially equal and opposite to said second signal voltage source.

4. An attitude control system for an aircraft having a control surface comprising, a servomotor for moving said surface, means responsive to craft attitude for developing a first signal voltage proportional to deviation of said attitude from a predetermined reference attitude, means responsive to control surface displacement from a streamlined position for developing a second signal voltage proportional to said displacement, means connecting said signal voltages in opposing relation to actuate said servomotor, a second motor energized in accordance with said second signal voltage, means responsive to rate of movement of said second motor for opposing energization thereof, and means responsive to displacement of said second motor for developing a third signal voltage opposing said secondary signal voltage.

5. An attitude control system for an aircraft having a control surface comprising, a servomotor for moving said surface, means responsive to craft attitude for developing a first signal voltage proportional to deviation of said attitude from a predetermined reference attitude, means responsive to control surface displacement from a streamlined position for developing a second signal voltage proportional to said displacement, means connecting said signal voltages in opposing relation to actuate said servomotor, manually operable means for developing a maneuvering signal voltage, motor means connected to be energized selectively in response to the resultant of said maneuvering signal voltage and said first or said second signal voltage, means responsive to rate of movement of said second motor for opposing movement thereof, means responsive to displacement of said second motor for developing a third signal voltage, and means for connecting said third signal voltage to oppose said resultant voltage.

6. A condition responsive control system comprising a member movable to regulate said condition, means for generating a first signal in response to deviation of said condition from a desired value, means utilizing said first signal for moving said member to restore said condition to said normal value, means for generating a second signal in response to deviation from a normal value of a condition of said movable member, said condition of said movable member being subject to steady state deviations from said normal value in variable trim relation to said regulated condition, means utilizing said second signal to move said member, a third signal generating means degeneratively in circuit with said second signal generating means, and time element means responsive to non-transient differences between said second and said third signals and associated with said third generating means for nullifying said non-transient differences.

7. A condition responsive control system comprising a member movable from a normal null position to control said position, motor means for moving said member from said null position throughout a range of condition controlling positions, said position having a variable relation to the desired value of said condition, means for generating a first signal responsive to deviation of said condition from a predetermined value, means for generating a second signal responsive to displacement of said member from said null position, means for combining said first and second signals in opposing relation and utilizing the resultant signal to control said motor means, a third signal generating means degeneratively in circuit with said second signal means, and time element means responsive to non-transient differences between said second and third signals and associated with said third generating means for nullifying said non-transient differences.

8. A condition control system comprising a member movable from a normal null position to control said condition, motor means for moving said member, means for generating a first signal in response to deviation of said condition from a desired value, means for generating a second signal proportional to displacement of said member from said null position, means combining said first and second signals in opposing relation and utilizing the resultant signal to actuate said motor means, means for generating a third signal, a second motor for actuating said third signal generating means, means additionally actuated by said second motor to oppose motor movement in proportional to the rate of motor movement, and means responsive to non-transient differences between said second and third signals for energizing said second motor to nullify said differences.

9. A condition responsive control system comprising a member movable from a normal null position to control said condition, motor means for moving said member, signal circuit means including a plurality of signal voltage sources connected to energize said motor, means responsive to deviation of said condition from a desired normal value and connected to control one said signal voltage source, means responsive to displacement of said member from said null position and connected to control a second said voltage source, said first and second signal voltage sources being connected in opposing relation in said signal circuit, a third signal voltage source, and means responsive to the substantially steady state output difference of said second signal voltage source and said third signal voltage source and connected to control said third signal voltage source in a sense substantially equal and opposite to said second signal voltage source.

10. An attitude control system for an aircraft having a control surface comprising, a servomotor for moving said surface, means responsive to craft attitude for developing a first signal voltage proportional to deviation of said attitude from a predetermined reference attitude, means responsive to control surface displacement from a streamline position for developing a second signal voltage proportional to said displacement, means connecting said signal voltages in opposing relation to actuate said servomotor, a third signal voltage degeneratively in circuit with said second signal voltage, a second motor energized in accordance with the difference of said second and third signal voltages, means responsive to rate of movement of said second motor for opposing energization thereof, and means responsive to displacement of said second motor for controlling the amplitude and phase of said third signal voltage.

11. An attitude control system for an aircraft having a control surface comprising, a servomotor for moving said surface, means responsive to craft attitude for developing a first signal voltage proportional to deviation of said attitude from a predetermined reference attitude, means responsive to control surface displacement from a streamline position for developing a second signal voltage proportional to said displacement, means connecting said signal voltages in opposing relation to actuate said servomotor, a third signal voltage connected to energize said servomotor, motor means for actuating said third signal voltage, means for developing a maneuvering signal voltage, said motor means adapted to be energized selectively in response to the result of said maneuvering signal voltage, said first signal voltage, and said third signal voltage, or in response to said maneuvering signal voltage, said second signal voltage, and said third signal voltage, and means responsive to rate of movement of said second motor for opposing movement thereof.

12. A condition responsive control system comprising a member movable to regulate said condition, means for generating a first signal in response to deviation of said condition from a desired value, means utilizing said first signal for moving said member to restore said condition to said normal value, means for generating a second signal in response to deviation of said movable member from a normal value, said movable member being subject to steady state deviation from said normal value in variable trim relation to said regulated condition, means utilizing said second signal to move said member, means for generating a third signal, and time element means selectively responsive to non-transient variation of said second and said third signals for generating a fourth signal substantially equal and opposite thereto, or responsive to non-transient variations of said first and third signals for generating a fifth signal substantially equal and opposite thereto.

13. A condition responsive control system comprising a member movable from a normal null position to control said condition, motor means for moving said member from said null position throughout a range of positions, said positions having a variable trim relation to the desired value of said condition, means for generating a first signal response to deviation of said condition from a predetermined normal value, means for generating a second signal responsive to displacement of said member from said null position, means for combining said first and second signals in opposing relation and utilizing the resultant signal to control said motor means, means for generating a command signal, and time element means selectively responsive to the non-transient difference of said command signal and said first signal or said command signal and said second signal to generate bucking signals equal and opposite thereto to control said motor means.

14. A condition control system comprising a member movable from a normal null position to control said condition, motor means for moving said member, means for generating a first signal in response to deviation of said condition from a desired value, means for generating a second signal proportional to displacement of said member from said null position, means combining said first and second signals in opposing relation and utilizing the resultant signal to actuate said motor means, means for generating a third signal, a second motor for actuating said third signal generating means, means additionally actuated by said second motor to oppose motor movement in proportional to the rate of motor movement, means for developing a command signal voltage, said second motor means adapted to be selectively energized in response to the resultant of said command signal voltage said first signal, and said third signal, or energized in response to the resultant of said command signal voltage, said second signal, and said third signal, for selectively nullifying either of said resultant signals by said third signal.

15. An attitude control system for an aircraft having a control surface comprising, a servomotor for moving said surface, means responsive to craft attitude for developing a first signal voltage proportional to deviation of said craft from a predetermined reference attitude, means responsive to control surface displacement from a streamline position for developing a second signal voltage proportional to said displacement, means connecting said signal voltages in opposing relation to actuate said servomotor, a third signal generating means degeneratively in circuit with said second signal voltage, and time element means responsive to non-transient differences between said second and third signal voltages and associated with said third generating means for nullifying said non-transient differences.

16. A condition control system comprising a member movable from a normal position to control said condition, motor means for moving said member, means for generating a first signal in response to deviation of said condition from a desired value, means for generating a second signal proportional to displacement of said member from said null position, means for combining said first and second signals in opposing relation and utilizing the resultant signal to actuate said motor means, means for generating a third signal, a second motor for actuating said third signal generating means, means additionally actuated by said second motor to oppose motor movement in proportional to the rate of motor movement, and means selectively responsive to non-transient differences between said first and third signals or said second and third signals for energizing said second motor to selectively nullify said non-transient differences.

17. An attitude control system for an aircraft having a control surface comprising a servomotor for moving said surface, means responsive to craft attitude for developing a first signal voltage proportional to deviation of said craft from a predetermined reference attitude, means responsive to control surface displacement from a streamline position for developing a second signal voltage proportional to said displacement, means connecting said signal voltages in opposing relation to actuate said servomotor, means for generating a third signal to actuate said servomotor, and time element means selectively responsive to non-transient differences between said first and third signal voltages or said second and third signal voltages and being operatively connected with said third signal generating means to selectively nullify said non-transient differences.

CHARLES M. YOUNG.

References Cited in the file of this patent

UNITED STATES PATENTS

| Number | Name | Date |
|---|---|---|
| 2,115,086 | Riggs | Apr. 26, 1938 |
| 2,300,537 | Davis | Nov. 3, 1942 |
| 2,423,337 | Moseley | July 1, 1947 |
| 2,429,642 | Newton | Oct. 28, 1947 |
| 2,450,907 | Newton et al. | Oct. 12, 1948 |
| 2,513,537 | Williams | July 4, 1950 |
| 2,545,343 | Conviser | Mar. 13, 1951 |
| 2,582,305 | Young | Jan. 15, 1952 |

OTHER REFERENCES

"Theory of Servomechanisms," by James, Nichols and Phillips, McGraw-Hill Book Co. Inc., 1947, p. 100.